United States Patent [19]

Dickie et al.

[11] 4,135,201

[45] Jan. 16, 1979

[54] DYNAMIC DAMPING FOR SECAM HIGH-FREQUENCY DE-EMPHASIS

[75] Inventors: Douglas P. Dickie, Portland; Larry A. Nelson, Hillsboro, both of Oreg.

[73] Assignee: Tektronix, Inc., Beaverton, Oreg.

[21] Appl. No.: 776,066

[22] Filed: Mar. 9, 1977

[51] Int. Cl.[2] ........................ H04N 9/537; H04N 9/50; H04N 5/14

[52] U.S. Cl. ........................................ 358/40; 358/23; 358/37

[58] Field of Search ........................ 358/21, 23, 27, 31, 358/36, 40, 37; 307/295; 333/70 R

[56] References Cited

U.S. PATENT DOCUMENTS 3,956,719 5/1976 Waku et al. ............................ 333/72

OTHER PUBLICATIONS

Chrominance Circuits for SECAM Color TV Receiver: National Technical Report, vol. 20, No. 6, pp. 786–800, Dec. 1974.

*Primary Examiner*—Robert L. Griffin
*Assistant Examiner*—Aristotelis M. Psitos
*Attorney, Agent, or Firm*—Adrian J. La Rue

[57] ABSTRACT

A switching element is placed across a filter and controllably activated to dynamically change the response of the filter. Specifically, additional damping is switched into the "Bell" characteristic, interjected during blanking and removed after the beginning of white lead-in, to dynamically change the response of the band-pass "Bell" filter in a Sequential Color and Memory Television System.

2 Claims, 4 Drawing Figures

DYNAMIC DAMPING FOR SECAM HIGH-FREQUENCY DE-EMPHASIS

BACKGROUND OF INVENTION

As is well known, in a Sequential Color and Memory Television System, hereinafter referred to as SECAM, the frequency modulated sub-carrier is pre-emphasized to reduce the relative amplitude of the central frequencies. Correspondingly, this predistortion of the spectrum is equalized by a filter with a bell-shaped response used at the reception end before demodulation. This filter, which separates the chrominance from the luminance and synchronization components of the SECAM signal is, most generally, a parallel LRC network (inductance, resistance and capacitance) having a response maximized at about 4.286 MHz. The filter, because of its swept frequency response is conventionally known as a "Bell" filter and suffers from two principle deficiencies. The first deficiency is that whenever synchronization or luminance components of the SECAM signal are passed therethrough, a coherent interfering signal is injected which effects operation of limiters used in SECAM decoders. The second deficiency is that when the chrominance portion of the signal is turned on (or off), the result of this switching transient combines with the steady state to create a spurious frequency modulation. This transient causes a shift in the zero crossings of the subcarrier toward a higher or a lower frequency which is subsequently limited and decoded.

These above described deficiencies therefore make color sequence determination from the white lead-in very difficult. In addition to this most difficult problem, these deficiencies also inhibit parameter measurements of the SECAM signals during horizontal blanking.

SUMMARY OF INVENTION

Accordingly, the present invention overcomes the disadvantages and deficiencies heretofore discussed by providing a dynamic damping network for SECAM high-frequency de-emphasis. Added damping is switched into the "Bell" characteristic, injected during blanking and removed very shortly after the incidence of white lead-in, to change the response of the filter which enables proper decoding of the white lead-in.

It is therefore an object of the present invention to provide an improved SECAM decoder.

It is another object of the present invention to provide a means of controllably damping a filter to dynamically change the response of the filter.

It is still another object of the present invention to provide a SECAM decoder whereby any switching element can be placed across the damping resistor of a "Bell" filter and activated during a portion of the signals blanking interval to dynamically change the response of the filter.

It is still yet another object of the present invention to provide an improved filter network.

Additional objects and advantages of the present invention will be apparent from the following detailed description of one preferred embodiment shown in the attached drawings. It is to be understood, however, that this embodiment is not intended to be exhausting nor limiting of the invention but is given for purposes of illustration in order that others skilled in the art may fully understand the invention and principles thereof and the manner of applying it in practical use so that they may modify it in various forms, each as may be best suited to the conditions of the particular use.

DESCRIPTION OF DRAWINGS

In the drawings, wherein same reference numbers identify same components.

DESCRIPTION OF INVENTION

Figure 1:
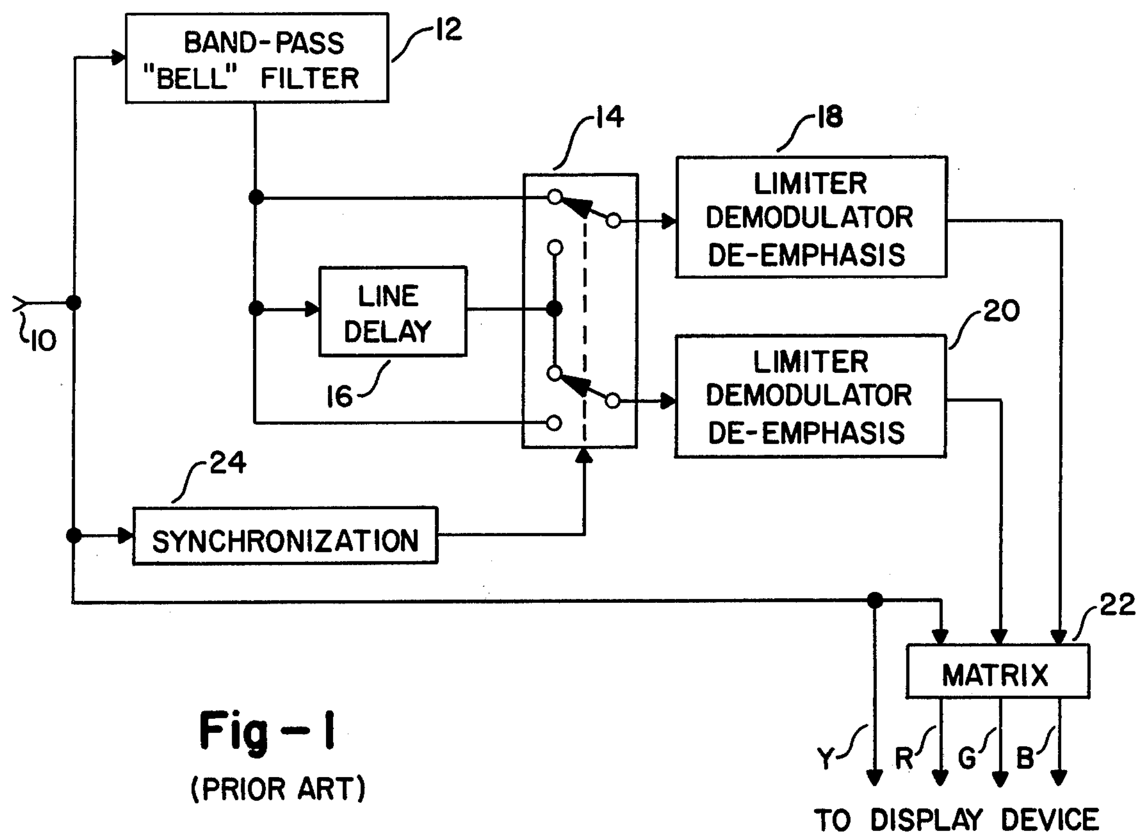
FIG. 1 is a basic block diagram of a known SECAM decoder in accordance with the prior art.

Reference will now be made to the block diagram of the SECAM decoder shown in FIG. 1. A SECAM composite video signal is applied to the decoder via an input 10. The chrominance portion of the composite video signal is separated from the luminance portion and this chrominance portion has its modulated subcarrier re-established to the correct amplitude via a bandpass filter and "Bell" stage 12. This chrominance signal then goes via first and second paths to an electronic switch 14. Disposed in one of the paths is a line delay stage 16, usually having a 64 microsecond delay time at the subcarrier frequency, which functions to ensure that the chrominance portion is used properly; in SECAM it is well known that the composite video signal is composed of two chroma signals which are transmitted sequentially, each one for the duration of one scanning line so that only one modulates the subcarrier in turn. Although it appears from the drawings that three paths to the electronic switch are used, in fact there is only two. A delayed path and a direct path since the switch only allows two signals to be processed.

The electronic switch 14 directs or routes the two chroma signals, hereinafter referred to as $D'_R$ and $D'_B$, to a pair of similar processing stages 18 and 20. Each processing stage includes a limiter, a frequency discriminator and a de-emphasis network for conventional processing the $D'_R$ or the $D'_B$ signal. Thus, the electronic switch 14 ensures that the $D'_R$ signal, whether coming via the direct path or the delayed path, always goes to the $D'_R$ processor, say processing stage 18, and that the $D'_B$ signal, whether coming via the direct path or the delayed path, always goes to the $D'_B$ processor, which in this description is now defined as processing stage 20. As shown, the electronic switch is operated by sequencing pulses which are, of course, conventionally separated and derived from the SECAM composite video signal via a synchronization stage 24.

Following the processing stages 18, 20 wherein the D'R and D'B signals are limited, demodulated and treated to the advantages of de-emphasis, the processed $D'_R$ and $D'_B$ chroma signals are combined with the luminance signal portion by a conventional matrix stage 22 to produce primary signals which are needed by a display device. In this embodiment, these primary signals are indicated by R for red, B for blue and G for green, and are available for use or are applied to, say, Wehnelt electrodes of a three gun receiver (not shown) while the luminance signal Y is applied to the cathode of this tube.

Figure 2:
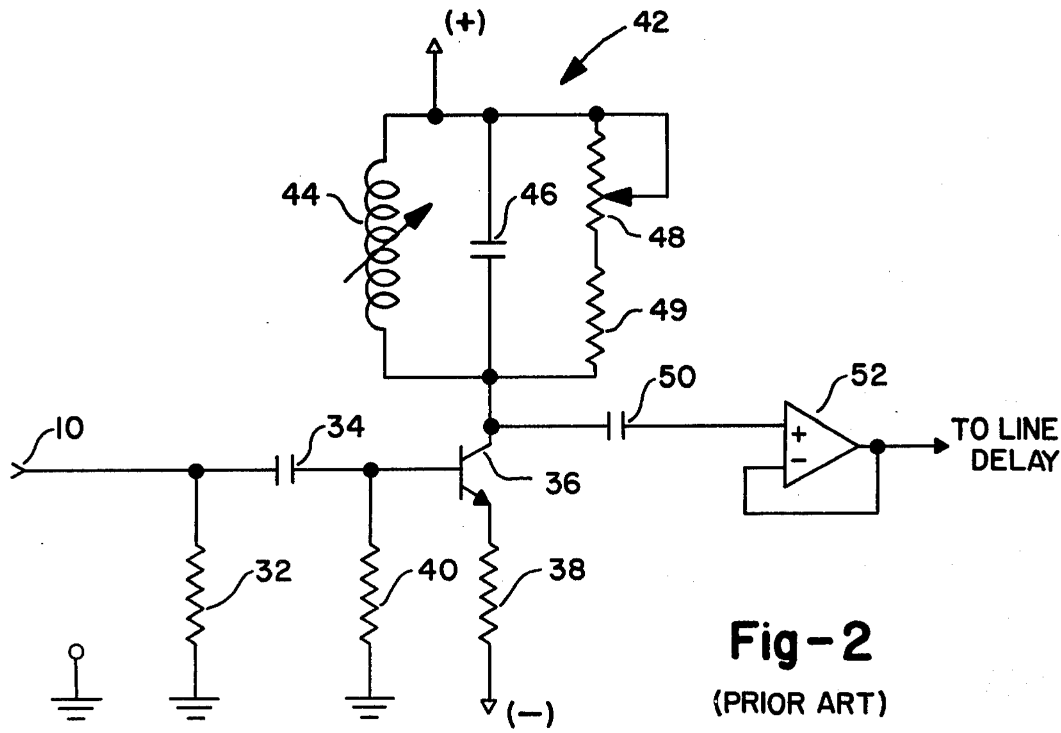
FIG. 2 is a portion of a SECAM decoder to detail a typical bandpass "Bell" filter stage of the prior art.

In FIG. 2 it is seen that the SECAM composite video signal may be applied to a transistorized discrete circuit including the bandpass "Bell" filter. The signal is applied to the terminal 10 across a terminating resistor 32, usually 75 ohms, disposed between the terminal 10 and ground. The terminated signal is then AC coupled across a capacitor 34 to the base of a self biased transistor amplifier comprising an NPN transistor 36, emitter resistor 38 and base return resistor 40. The collector of transistor 36 is then coupled to the filter generally indicated at 42 which comprises a variable inductor 44, a capacitor 46 and a resistor 48, which may be variable as shown when used in conjunction with the resistor 49, all connected in parallel. The filter output is then AC coupled via the capacitor 50 to a buffer amplifier, preferrably an emitter follower such as the amplifier 52, the output of which is the parallel path to the electronic switch 14 in FIG. 1. It should be mentioned that the circuit receives power from suitable sources of energy as indicated by (+) and (−).

Figure 3:
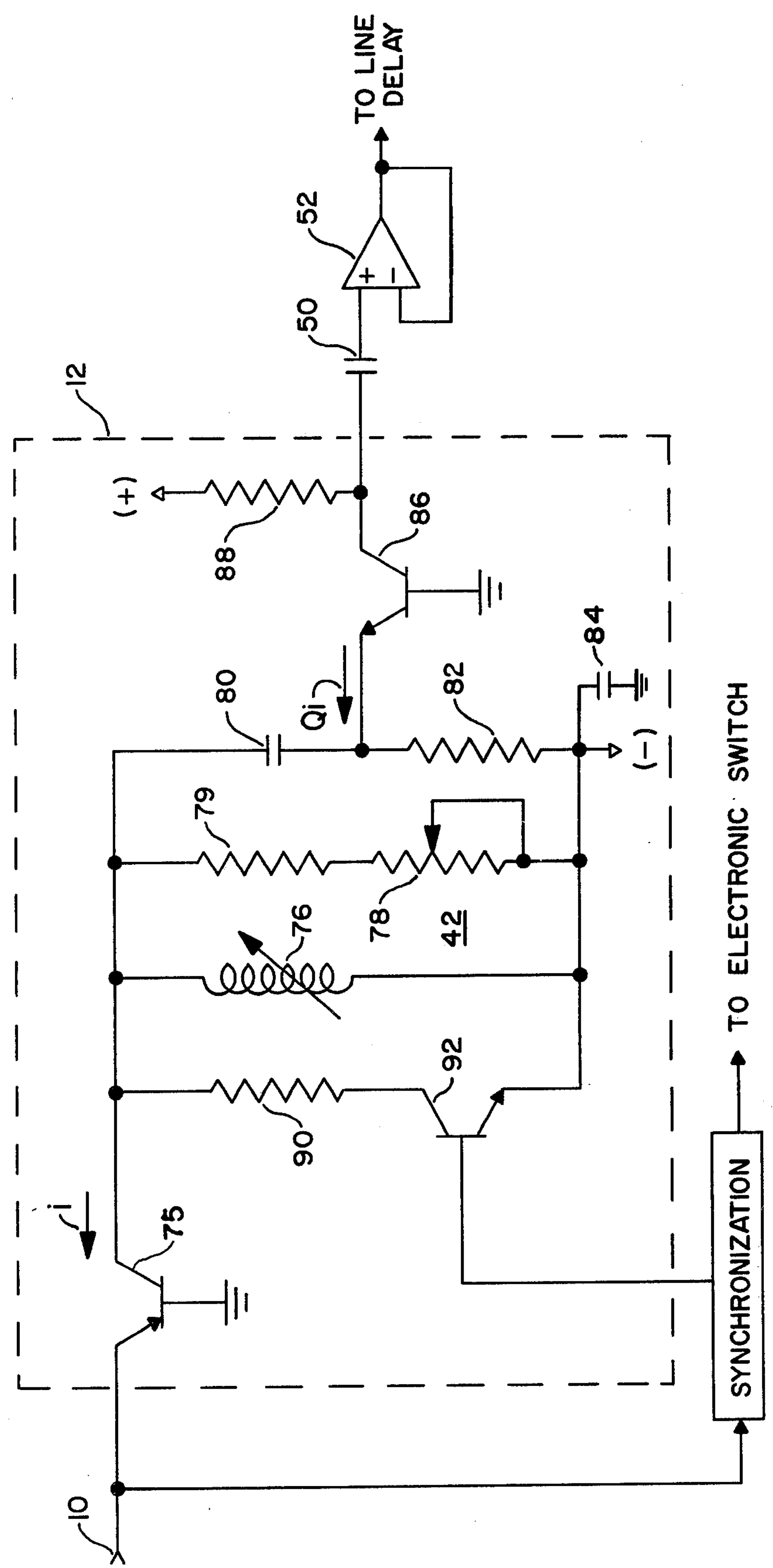
FIG. 3 is a schematic diagram of the bandpass "Bell" filter stage of the SECAM decoder in accordance with the present invention.

Referring now to FIG. 3 there is shown the bandpass "Bell" filter stage 12 according to the present invention. The SECAM composite video signal at input 10 is applied to the emitter of a PNP grounded base transistor 75 so that a current i flows in the collector thereof as indicated. This current pulses a parallel resonant circuit comprising an inductor 76, which may be variable, a resistor 78, which may be variable when used along with a resistor 79, and the series connected capacitor 80 and resistor 82 connected between the collector of the transistor 75 and a source of reference potential, −. A bypass capacitor 84, coupled between the already mentioned reference potential and ground, insures that the potential end of the parallel circuit is AC grounded for obvious reasons. Disposed between the junction of the capacitor 80 and resistor 82, and ground, is the emitter base junction of yet another grounded base amplifier, including a PNP transistor 86, having a current Qi, whose collector is returned to a source of reference potential via a collector load resistor 88. The output of the filter is taken from this last mentioned collector which is AC coupled via the coupling capacitor 50. This output, like the output in the FIG. 2 embodiment, is the parallel path to the electronic switch 14 via capacitor 50 and buffer amplifier 52. Since the transistor 86 is a portion of the filter network, a current gain is realized. This current gain can be conventionally shown to have a value equal to Q, where Q is the well known quality factor of the resonant circuit. This technique provides the gain Q without loading or detuning the filter as opposed to the prior art. Additionally, the circuit provides a high degree of isolation at both the input and output since both transistors are connected in the common base configuration. Disposed in parallel with the filter 42 is a series connected damping resistor 90 and switching transistor 92 which is preferrably of the NPN type. Switching pulses, derived in the synchronization stage 24, are applied to the base of the transistor 92 to thereby render such transistor conductive only during damping time to be explained hereinafter.

Figure 4:
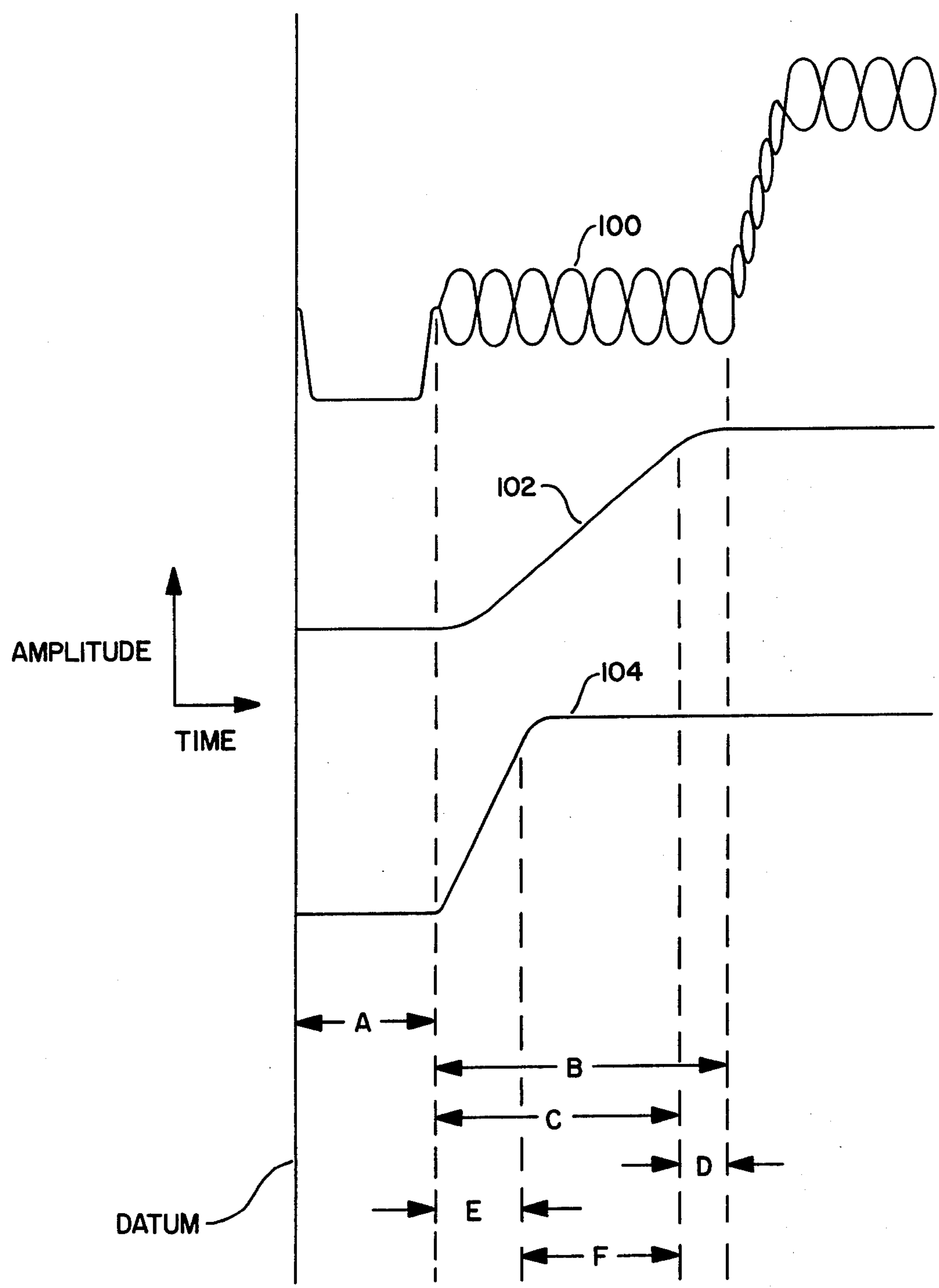
FIG. 4 is a line drawing of a portion of an encoded SECAM signal to detail the line blanking thereof, a line drawing of the response obtained after demodulation of the SECAM signal when such signal is passed through the filter in accordance with the prior art, and a line drawing of the response obtained after demodulation of the SECAM signal when such signal is passed through the filter in accordance with the present invention.

Reference should be made to FIG. 4 wherein there is shown, say, a portion of a typical SECAM signal 100 during the blanking interval. This drawing shows that during a time A, the subcarrier is suppressed but during the time B and thereafter the suppression of the subcarrier ceases and the undeviated subcarrier is transmitted for the remainder of the back porch. As is well known, the signal level during the interval B provides a reference frequency, specifically the zero chrominance level which is used as a reference without which demodulation would be meaningless. It is also during this interval B that the prior art filters are ineffective because during the interval A, the filter is caused to produce a coherent interfering signal due to the sync impulse and corresponding filter action or response. Additionally, the abrupt start of subcarrier beginning at the end of interval A produces the already mentioned second deficiency. Therefore, during interval B, when the subcarrier is not suppressed, the two responses, caused by filter ringing, add together thereby effecting the operation of other circuits which depend upon information contained within the signal during the interval B for proper operation. An example of this effect is the waveform 102 wherein is depicted the waveform 100 after demodulation. It can be seen that this interfering signal produces a waveform having a response with a long rise time and delay, indicated by the interval C. Due to this rounding effect, the signal can only be used during the interval D where precise instrumentation is desired. Additionally, this short interval may prevent reliable color sequencing and color enable of degraded signals where this information is derived from the white lead-in.

Attention is next directed to waveform 104 wherein is shown the response, after demodulation, of the waveform 100 when such signal is passed through the filter in accordance with FIG. 3 and the present invention. From this drawing, it is seen that a shorter rise time and delay, duration indicated by E, is obtained and in effect the interval C has been reduced considerably from that shown in waveform 102. This reduction thereby leaves an interval F which can be used where precise instrumentation or picture quality is desired. This improvement or effect is produced by simply switching transistor 92 into conduction preferrably at the beginning of the duration A, thereby adding the resistor 90 in parallel with the filter which damps the interfering signal, i.e., changes the Q of the filter. Additionally, using the techniques of the subject invention, the damping can be selectively applied, i.e., transistor 92 biased out of conduction, at any time during the interval B as desired.

It may be observed in the foregoing specification that such specification has not been burdened by the inclusion of large amounts of detail and specific information relative to such matter as circuitry, timing, etc. and the like since all such information is basically well within the skill of the art as of the present date. Examples of publications already in existence and relating to such aspects as set forth above are incorporated herein by reference: U.S. Pat. Nos. 3,863,264, 3,939,432, 3,949,417; Colour Television, "PAL, SECAM and Other Systems" by P. S. Carnt and G. B. Townsend, Volume 2, 1969 by Iliffe Books, Ltd for Wireless World; SECAM Colour T.V. System, printed by Nord-Graphique for the Compagnie Francaise De Television; Integrated Electronics Analog and Digital Circuits and Systems by Millman and Halkins, copyright 1972 by McGraw-Hill, Inc.; Circuit Concepts, copyright 1969 by Tektronix Inc.; and The Fourier Transform and Its Applications by Ron Bracewell, copyright 1965 by McGraw-Hill, Inc.

While there has been shown and described preferred embodiments of the present invention, it will be apparent to those skilled in the art that many changes and modifications may be made thereon. Therefore, the appended claims are intended to cover all changes and modifications that fall within the true spirit and scope of the invention.

The invention is claimed in accordance with the following:

1. A SECAM decoder for decoding a composite SECAM signal; the decoder comprising:

synchronization means for separating a synchronization signal from the composite SECAM signal;

filter means for separating the composite SECAM signal into a luminance signal and a chrominance signal and for re-establishing the amplitude of the subcarrier of the chrominance, said filter means including synchronously switchable damping means switched by said synchronization signal;

processing means responsive to said chrominance signal for providing color difference signals, said processing means including means for sequentially routing said chrominance signal to provide a sequential signal, and means for demodulating said sequential signal to provide said color difference signals; and means for combining said color difference signals and said luminance signal to provide primary color signals.

2. The SECAM decoder according to claim 1, wherein said switchable damping means comprises:

a series-connected damping resistor; and a switching transistor, the conduction thereof being controlled by said synchronization signal applied to the base of said switching transistor, thereby switching said damping resistor across said filter means according to said synchronization signal.

* * * * *